(12) United States Patent
Morin

(10) Patent No.: US 7,996,523 B2
(45) Date of Patent: Aug. 9, 2011

(54) FREE STRING MATCH ENCODING AND PREVIEW

(75) Inventor: Tom Morin, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 673 days.

(21) Appl. No.: 12/016,927

(22) Filed: Jan. 18, 2008

(65) Prior Publication Data

US 2009/0187568 A1      Jul. 23, 2009

Related U.S. Application Data

(60) Provisional application No. 61/021,873, filed on Jan. 17, 2008.

(51) Int. Cl.
*G06F 15/16* (2006.01)
*G06F 12/00* (2006.01)
(52) U.S. Cl. ............... 709/224; 709/225; 714/4.1
(58) Field of Classification Search .......... 709/223–229, 709/220–221, 250; 714/4.1
See application file for complete search history.

(56) References Cited

U.S. PATENT DOCUMENTS

| | | | | |
|---|---|---|---|---|
| 6,810,504 | B2 * | 10/2004 | Cooper et al. | 715/263 |
| 2001/0047429 | A1 * | 11/2001 | Seng et al. | 709/245 |
| 2002/0055960 | A1 * | 5/2002 | Cooper et al. | 707/536 |
| 2004/0015715 | A1 * | 1/2004 | Brown | 713/200 |
| 2004/0103315 | A1 * | 5/2004 | Cooper et al. | 713/201 |
| 2005/0091051 | A1 * | 4/2005 | Moriya et al. | 704/229 |
| 2005/0182778 | A1 * | 8/2005 | Heuer et al. | 707/101 |
| 2005/0188079 | A1 * | 8/2005 | Motsinger et al. | 709/224 |
| 2007/0300176 | A1 * | 12/2007 | Fischer et al. | 715/780 |
| 2008/0047012 | A1 * | 2/2008 | Rubin et al. | 726/23 |
| 2008/0162690 | A1 * | 7/2008 | Karagounis | 709/224 |
| 2009/0077619 | A1 * | 3/2009 | Boyce | 726/1 |

* cited by examiner

*Primary Examiner* — Zarni Maung
(74) *Attorney, Agent, or Firm* — patenttm.us

(57) ABSTRACT

A system for entering data in a format that is easy to use, enabling selection of encoding format and displaying the resulting search data string in format to enable generation of byte sets for supplying to free string match algorithm for application to network data.

18 Claims, 9 Drawing Sheets

FIG. 6
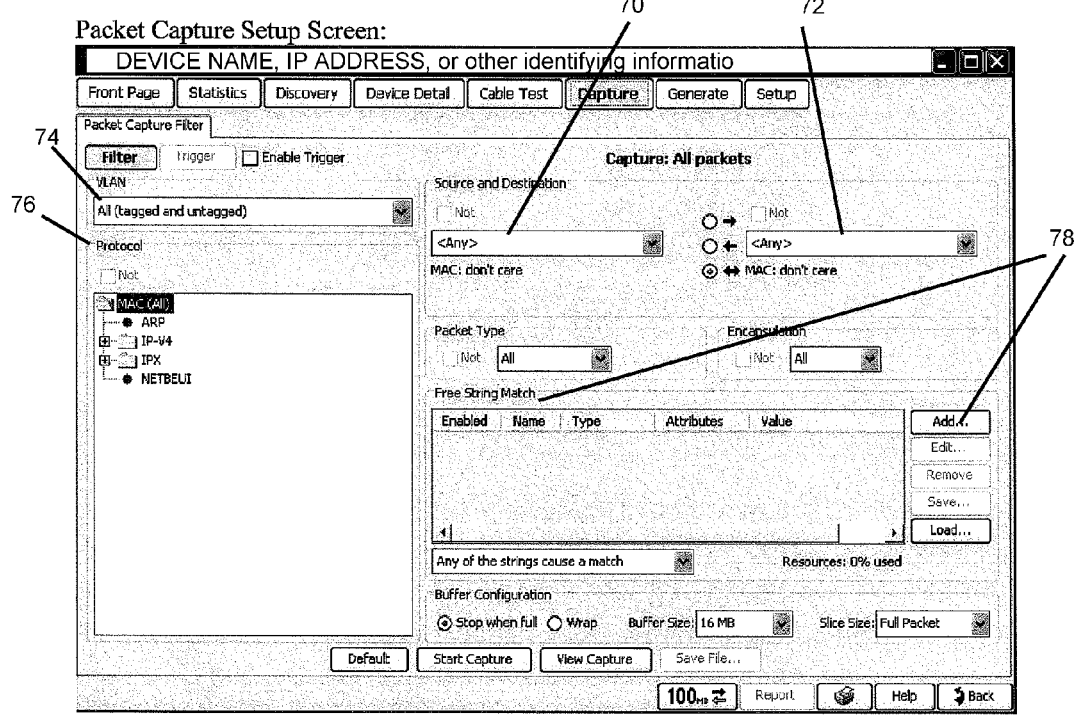
Available Free String Encodings:
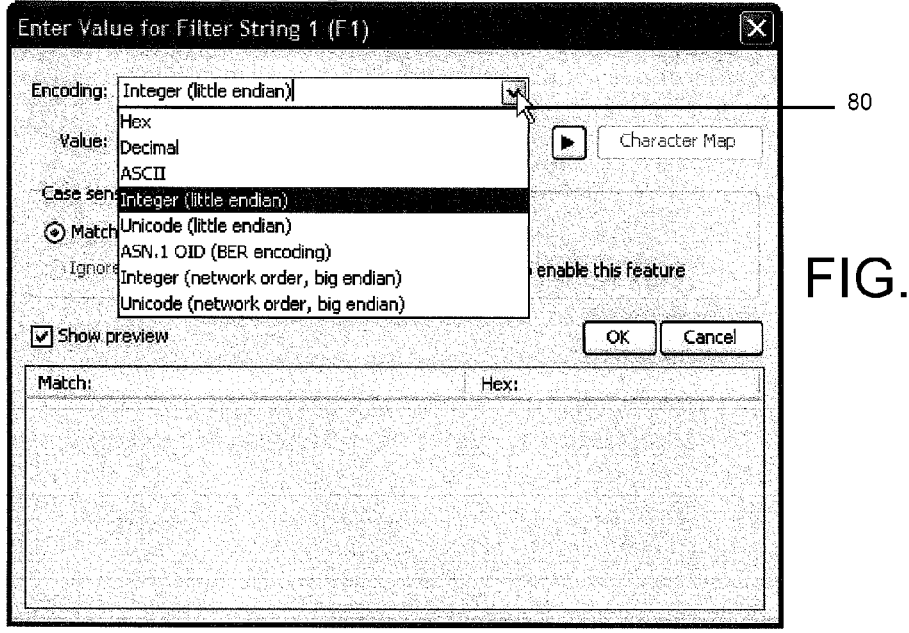
FIG. 7

Integer Example Converted to ASN.1:

Hex Example with Partial Match:

ASN.1 Example:

ASCII Example with Regular Expression Syntax:

US 7,996,523 B2

FREE STRING MATCH ENCODING AND PREVIEW

CROSS REFERENCE TO RELATED APPLICATIONS

This application claims priority of U.S. provisional patent application 61021873, filed Jan. 17, 2008.

BACKGROUND OF THE INVENTION

This invention relates to encoding and previewing of search string data.

In network test environments, for example, a technician is often looking for particular data strings, for the purpose of debugging or testing the network, or searching for networking problems or event occurrences.

Communications protocols have generally well defined structures consisting of specifications for the order and contents of fields within a message. Fields within a data stream in a given protocol may be sent in packets, a combination of values that control the flow of data, sometimes referred to as protocol header fields, or payload fields that contain information that is exchanged between devices on a network.

Information contained in a packet is often "encoded" to facilitate efficient processing by the computer applications that generate or consume the packet.

Since a network may be employing a variety of communication protocols and data encoding types, it can be cumbersome or impossible to find a particular data set or string in raw data received by a network test instrument.

The strings may be plain text, e.g. "uspto", but are more likely specific values described by the protocol a user is attempting to troubleshoot. Even plain text maybe encoded within a data packet using several different schemes, such as ASCII or Unicode. The protocol, the network or the operating systems of the devices being monitored may also affect the "byte order" of the data.

In a network test and measurement situation, for a user of packet capture applications for network testing, creating an encoded packet filter or trigger specification, to look for data or activity on the network as a part of the testing/measuring, can be difficult and error-prone, as the different protocols and encodings that may be in use result in data on the network that is complex to decode manually. Translating values that a user is interested in to the specifications required by the string match algorithm can be difficult, because a given encoding may involve complex rules. But such translation is heretofore been required, so that the user can specify to the string match algorithm what it is that is to be matched.

Without the ability to filter data packets, high speed, high utilization interfaces common in computer networks can quickly fill the packet capture capability of software and hardware-based packet analysis applications and devices.

Accordingly, some manner of filtering and easily specifying the filter values becomes desirable.

SUMMARY OF THE INVENTION

In accordance with the invention, a user interface is provided for entering data in a format that is convenient for a user and using the selected encoding generates the byte sets required by the data acquisition system's free string matching algorithms, significantly reducing the effort required to create valid byte sets for the data acquisition system. The user can also view the resulting byte sets in a preview window.

Accordingly, it is an object of the present invention to provide an improved method and apparatus for entering data for supplying free string match algorithms.

It is a further object of the present invention to provide an improved network test system that enables a user to easily enter and encode strings for matching in a variety of encoding and protocol situations.

It is yet another object of the present invention to provide an improved system that allows the user to see how the string data entered by the user will be encoded in a selected encoding format.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 6 illustrates an exemplary packet capture setup user interface screen; and

FIGS. 7-13 illustrate example entry interfaces for free string match of strings with different encoding types.

DETAILED DESCRIPTION

The system according to a preferred embodiment of the present invention comprises, in a network test environment, a user interface for entering data in a format that is convenient for a user, and using encoding that has been selected, generates byte sets used by free string match algorithms of a data acquisition system, significantly reducing the effort required to create valid string match data.

Figure 1:
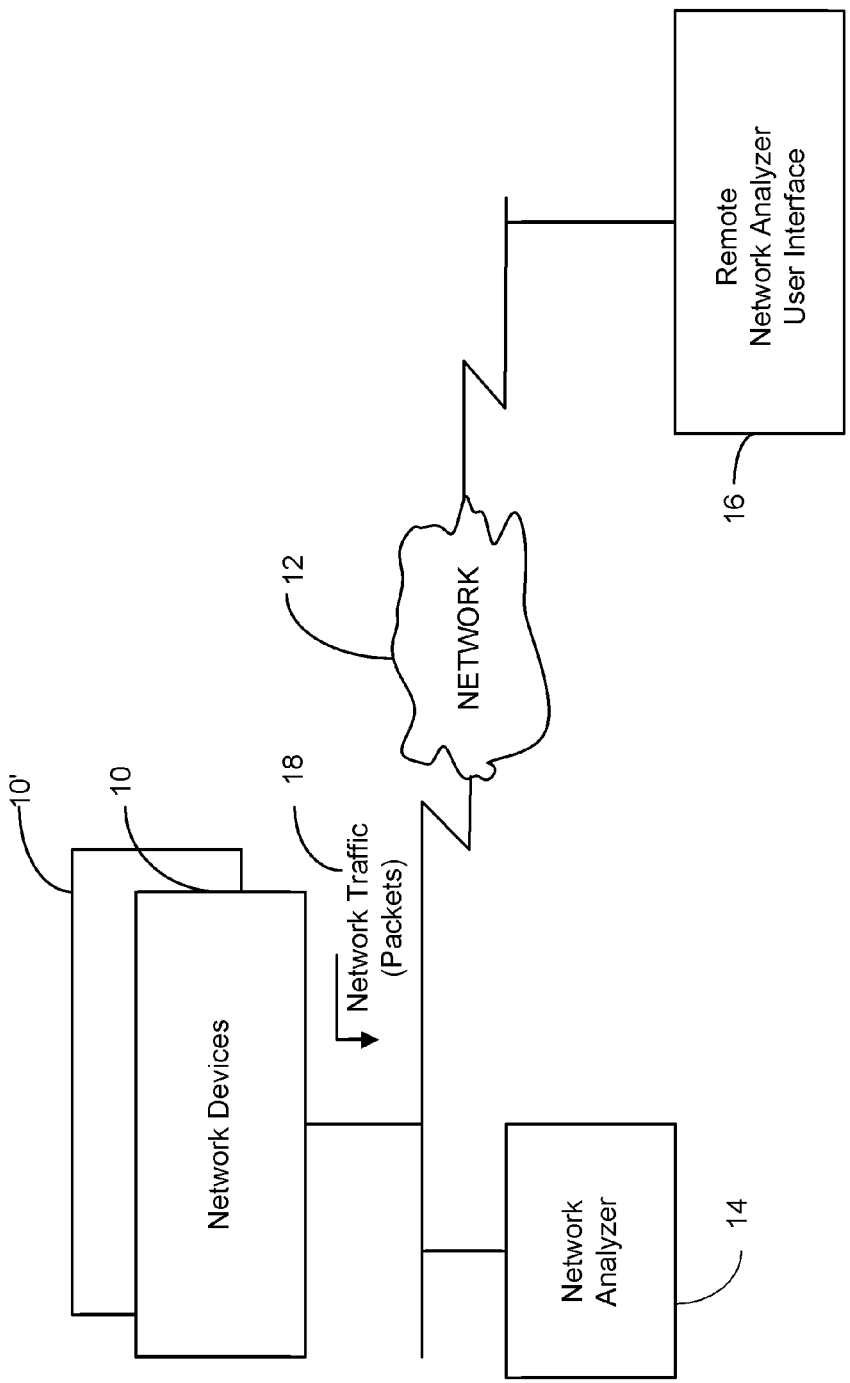
FIG. 1 is a block diagram of a network with test instrumentation attached thereto.

Referring to FIG. 1, a block diagram of a network with test instrumentation attached thereto, one or more network devices 10, 10', etc. are connected to network 12 and exchange traffic 18, which is typically in the form of packets, via the network. A network analyzer 14 is also connected to the network, and a remote network analyzer interface 16 enables a user to interact with the network analyzer to operate the analyzer and obtain data therefrom. The network analyzer comprises hardware and software, CPU, memory, interfaces and the like to operate to connect to and monitor traffic on the network, as well as performing various testing and measurement operations, transmitting and receiving data and the like. The remote network analyzer typically is operated by running on a computer or workstation interfaced with the network.

Figure 2:
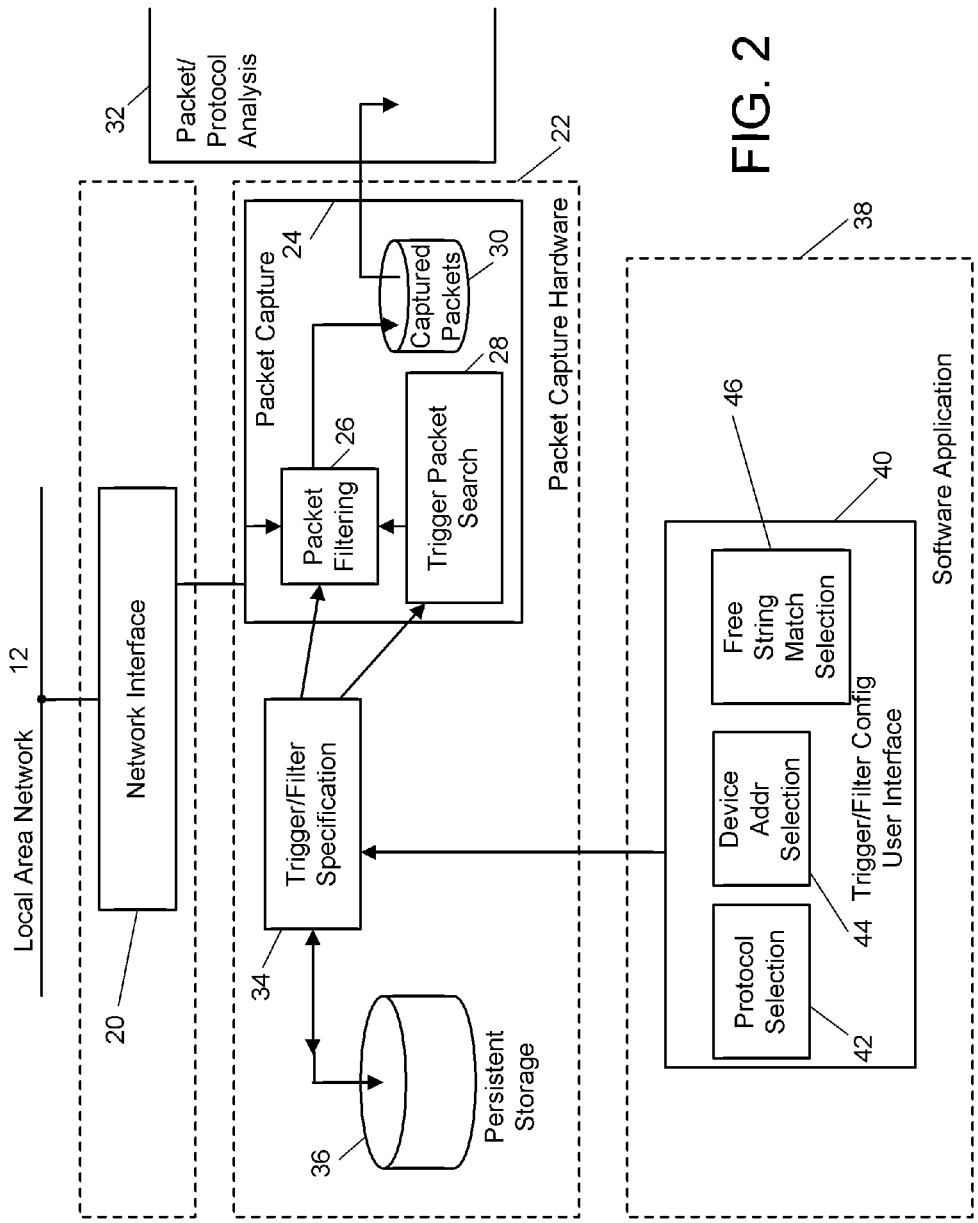
FIG. 2 is a system block diagram of a network analyzer of FIG. 1.

Referring now to FIG. 2, a system block diagram of a network analyzer 14, a network interface 20 provides the interface between the analyzer and the network 12. A packet capture hardware section 22 communicates with the network interface via packet capture block 24. Packet filtering block 26 receives packet traffic via the interface, having input from trigger packet search block 28. Captured packets from the packet filtering block are sent to captured packet storage 30, and may be further communicated to packet/protocol analysis block 32 for further processing and analysis consistent with network test instrument functionality.

Packet filtering and trigger packet search blocks 26, 28 receiving input from trigger/filter specification block 34, block 34 receiving and storing data in persistent storage 36.

The trigger/filter specification block 34 receives input from trigger/filter configuration user interface section 40, which is part of software application 38, section 40 comprising protocol selection 42, device address selection 44, and free string match selection 46.

In operation, the network analyzer, in the context of the present disclosure, will monitor network traffic via the network interface, capturing packets via packet capture block 24 as filtered by packet filtering block 26. If desired, trigger packet search block can control when the packet filtering is to begin. Captured packet can be stored in captured packet storage 30, and provided to packet/protocol analysis block 32.

Persistent storage 36 may contain stored trigger filter specifications for governing the operation of packet filtering block 26 and trigger block 28. New or modified filter specifications can be provided by a user, input from trigger/filter configuration user interface section 40. The user can select protocol, device address and free string match specification, which is supplied to block 34 and can be saved in storage 36 for future use or recall.

Figure 3:
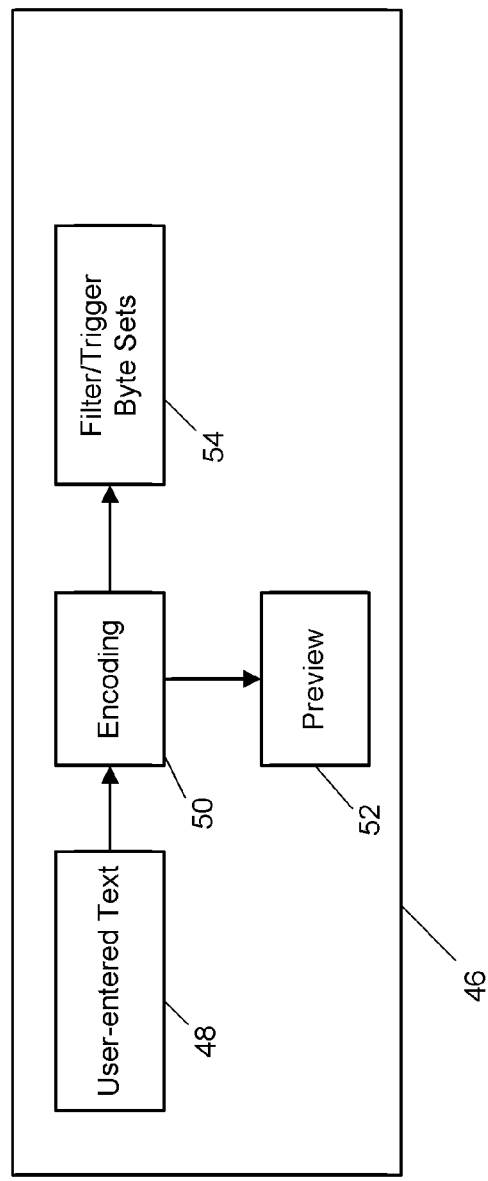
FIG. 3 is a block diagram of the free string match selection section of FIG. 2.

FIG. 3 is a block diagram of the free string match selection section 46, comprising user-entered text block 48, which provides input to encoding 50, output thereof being supplied to preview 52 and filter/trigger byte sets block 54.

Packet filtering block 26 is adapted to apply filtering to incoming network traffic to capture and store the type of packet data that a user may have specified a desire to store for analysis. An example would be in a case where the user is looking for a certain type of protocol, such as, for example, capture all HTTP traffic between certain devices. The trigger packet search block 28 can be set to start the packet filtering and storage based on a particular event, time of day, type of packet, etc. For example, a setting could be made to note when 2 particular devices on the network start to communicate with each other, to begin capturing packets. The captured packet data can then be sent to packet/protocol analysis block 32 for analysis that would be specific to the type of data and user needs.

Trigger/filter specification 34 comprises a state machine that is constructed based on the data from trigger/filter configuration user interface section 40.

Figure 4:
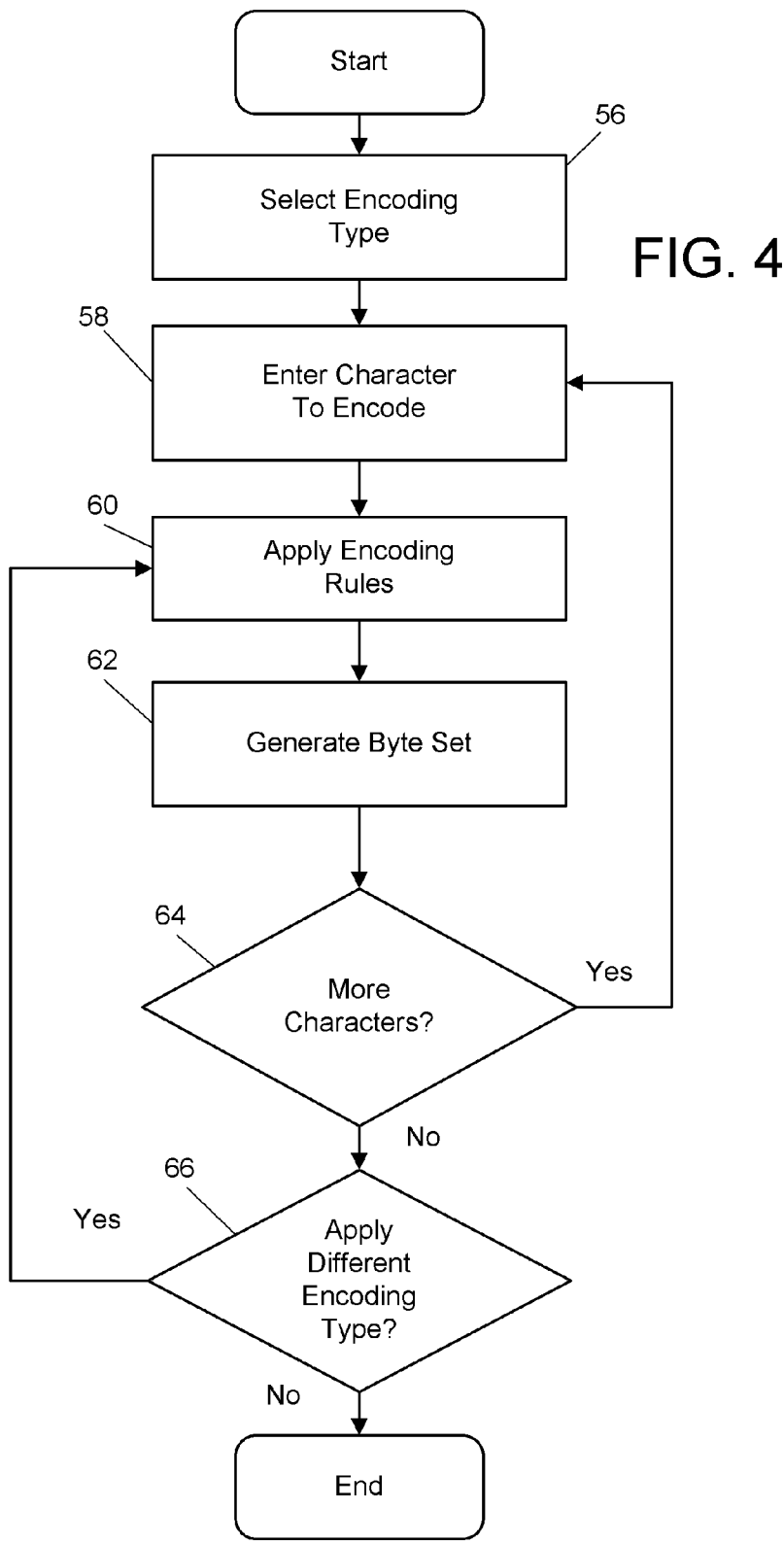
FIG. 4 is a flow chart of the user interaction with the user interface to enter data.

Referring now to FIG. 4, a flow chart of the user interface interaction steps with the user, the user might first select encoding type (step 56, discussed further in connection with FIG. 5 hereinbelow) and then the character to be encoded is entered (step 58), whereupon the encoding rules are applied in step 60 to generate a byte set in step 62. A byte set describes the possible values that match each byte of the free string specification, where each byte in a free string specification may match more than one actual byte value. Decision block 64 determines whether more characters are to be encoded and if yes, then processing loops back to step 56 for entry of more characters. Once no further characters are to be encoded, decision block 66 determines whether a different encoding type should be applied, looping back to step 60 if the answer is yes. When the answer at block 66 is no, then the process is complete.

Figure 5:
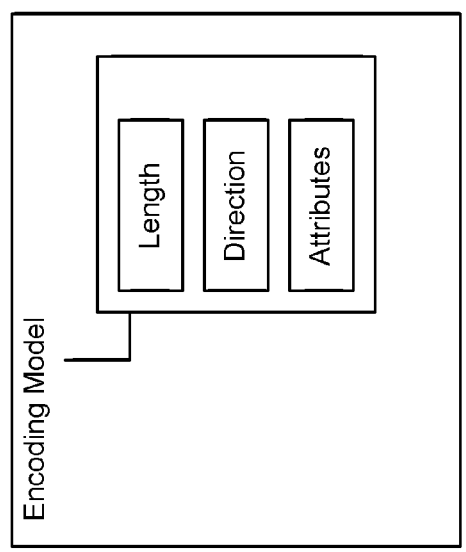
FIG. 5 is a block showing the encoding type selection parameters of a particular embodiment.

FIG. 5 is a block showing the encoding type selection parameters of a particular embodiment at step 56, for example. The encoding model includes length, which indicates the number of bytes, direction (e.g. little endian or big endian (representing data being transmitted with low byte followed by high byte or high byte followed by low byte). Attributes, such as "ignore case" or "match case" or "start search for data at beginning of protocol header", look for SNMP query, ANS.1 OID (BER encoding), etc. may also be designated, to provide wide variety of options of data searching for the user.

Consider an example, the user enters the search string as "4?". Depending upon the encoding chosen, this could represent different things. If encoding mode is ASCII, "4?" represents the character "4" followed by any character. If encoding is hexadecimal, "4?" represents 40, 41, 42, 43, 44, 45, 46, 47, 48, 49, 4A, 4B, 4C, 4D, 4E, or 4F. Still other encoding types could have different possibilities of what would be represented by "4?" as a string to be match.

Referring to FIG. 6, an exemplary packet capture setup user interface screen, to begin free string match operation, a user will select the various parameters that are of interest, choosing source and destination at 70, 72, networks to capture traffic from 74, protocol types to look for (or types to ignore) at 76. The free string match settings are accessed at 78.

As an example, selecting "Add . . . " at 78, would bring up an interface for entering the free string encoding, example of which are shown in FIGS. 7-13.

Referring to FIG. 7, the user can select encoding by selection of item 80. Example types in the illustration include Hex, Decimal, ASCII, Integer (little endian), Unicode, ASN.1 OID (BER encoding), Integer (network order, big endian), Unicode (network order, big endian), which are representative of encoding types that might be encountered on a typical network test situation. These examples are, of course, only example, and other encoding types can be provided for choosing, as warranted by the particular environment and test instrument configuration.

In the example of FIG. 7, Integer (little endian) is being chosen.

Figure 8:
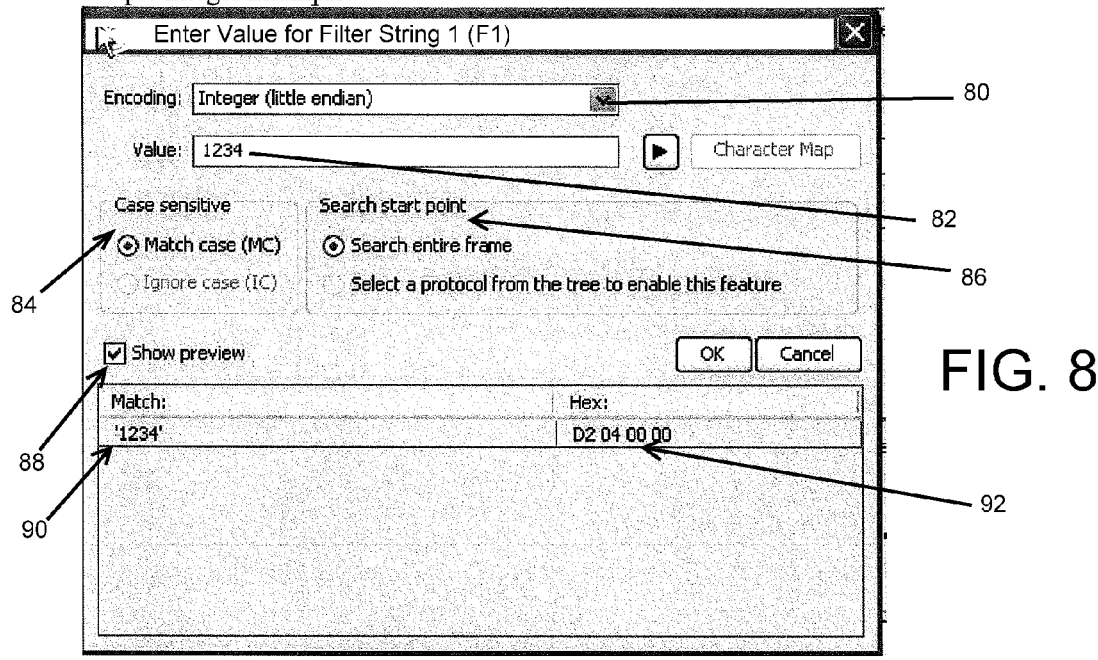

Referring to FIG. 8, the user may enter the value to be matched in the field 82 denoted "Value:". In the illustrated example, "1234" has been entered. A match case/ignore case selection 84 is provided, as well as a "Search start point" selection option 86. In the particular example in FIG. 8, the only choice given for search start point is "Search entire frame". Additional options might be available depending on the protocol type chosen at 76 in FIG. 6. This is noted by the phrase next to a non-selectable radio button "Select a protocol from the tree to enable this selection". Such other options can include to search within the payload or data fields, ignoring data in the frame header, for example.

A "Show preview" may be selected at 88, whereby the string to be matched is displayed at 90 under the title "Match:", and the hexadecimal data that represents the search string that will be employed by the apparatus in performing the string matching, is shown at 92 under the heading "Hex:". In this particular case, integer '1234' is encoded in hexadecimal as D2 04 00 00, the representation of the integer value 1234.

Figure 9:
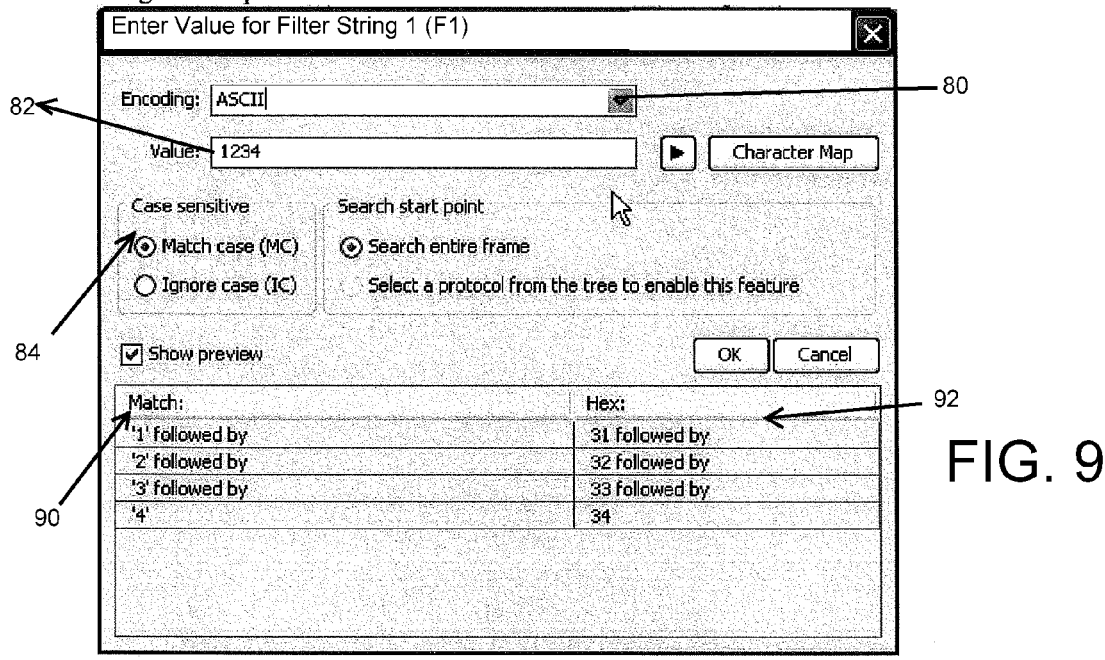

Referring to FIG. 9, if the encoding selection at 80 is now changed to ASCII, the value '1234' is encoded differently, as illustrated in the "Match:" section 90 and "Hex:" section 92. The user is able to immediately observe that the entered string will result in a search for a match of the characters "1" followed by "2" followed by "3", followed by "4". This is encoded in hexadecimal as 31 followed by 32 followed by 33 followed by 34. Since the encoding is now ASCII, case sensitive section 84 now has both Match case and Ignore case options available for choice, which would be applicable if the text string value at 82 contained letters.

Figure 10:
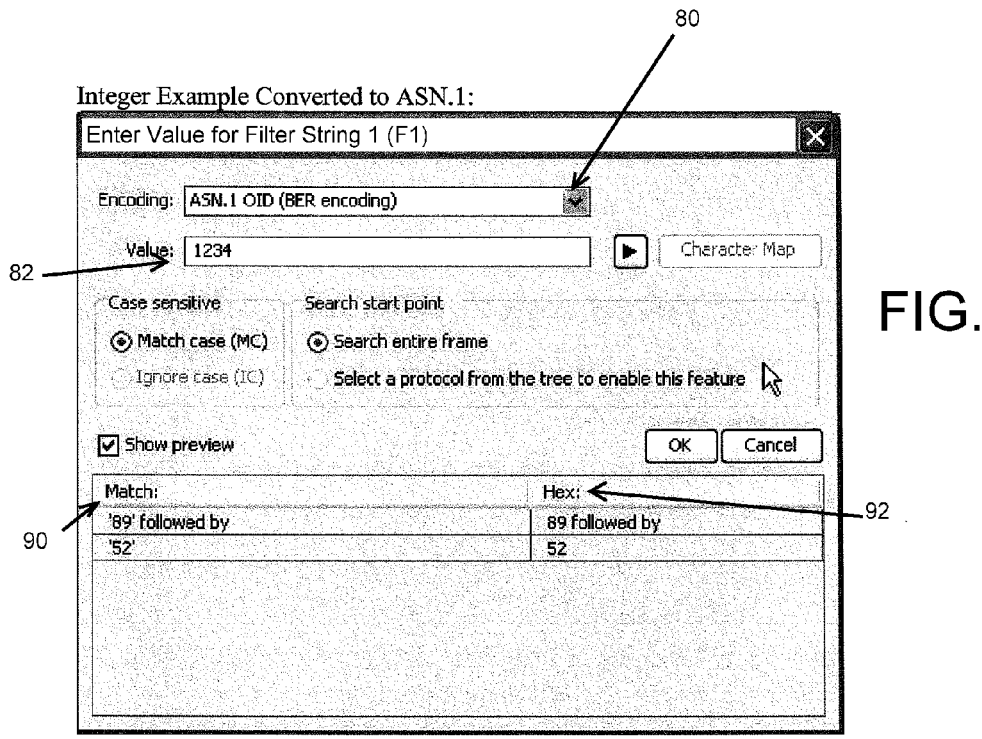

FIG. 10 illustrates the encoding and display thereof if the choice of encoding for '1234' is changed at 80 to ANS.1 OID (BER encoding). In this case, '1234' encodes as 89 followed by 52, shown in hexadecimal section 92, and also displays as 89 followed by 52 in the match section 90.

Figure 11:
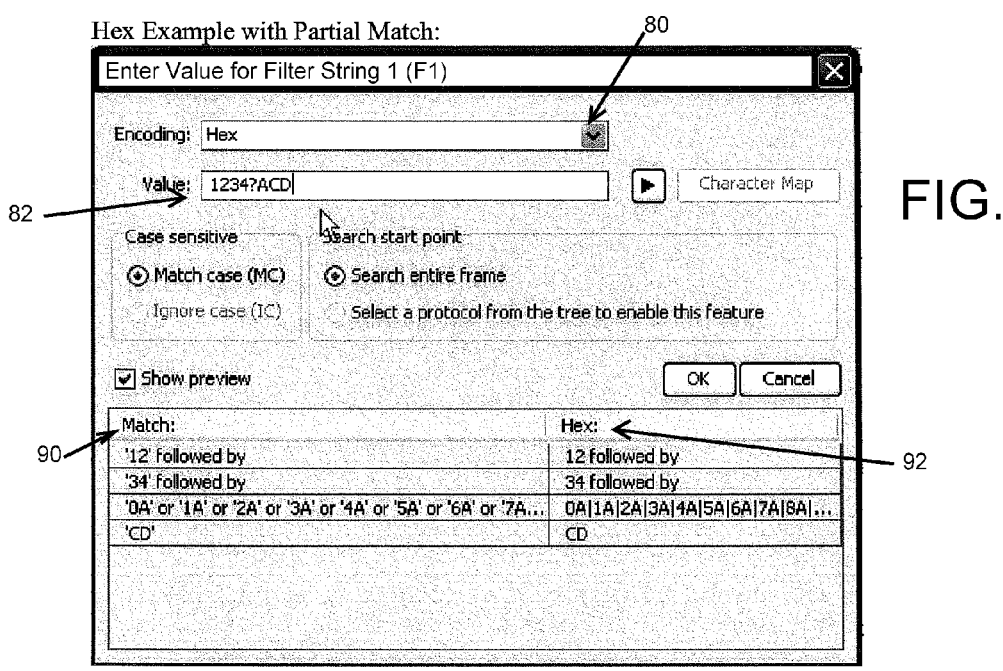

FIG. 11 is an example of the user interface showing the encoding and display thereof if the choice of a hexadecimal string of "1234?ACD" is entered. The Match: and Hex: sections show that the resulting string matching criteria would be 12, followed by 34, followed by any of (0A, 1A, 2A, 3A, 4A, 5A, 6A, 7A, 8A, 9A, AA, BA, CA, DA, EA or FA) followed by CD.

Figure 12:
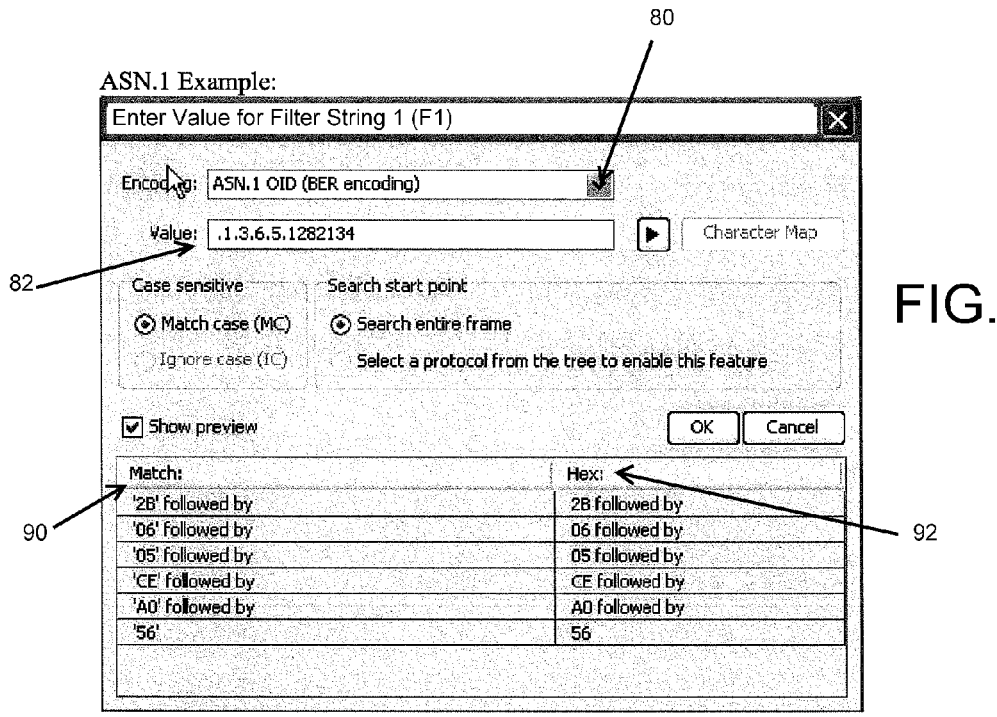
Figure 13:
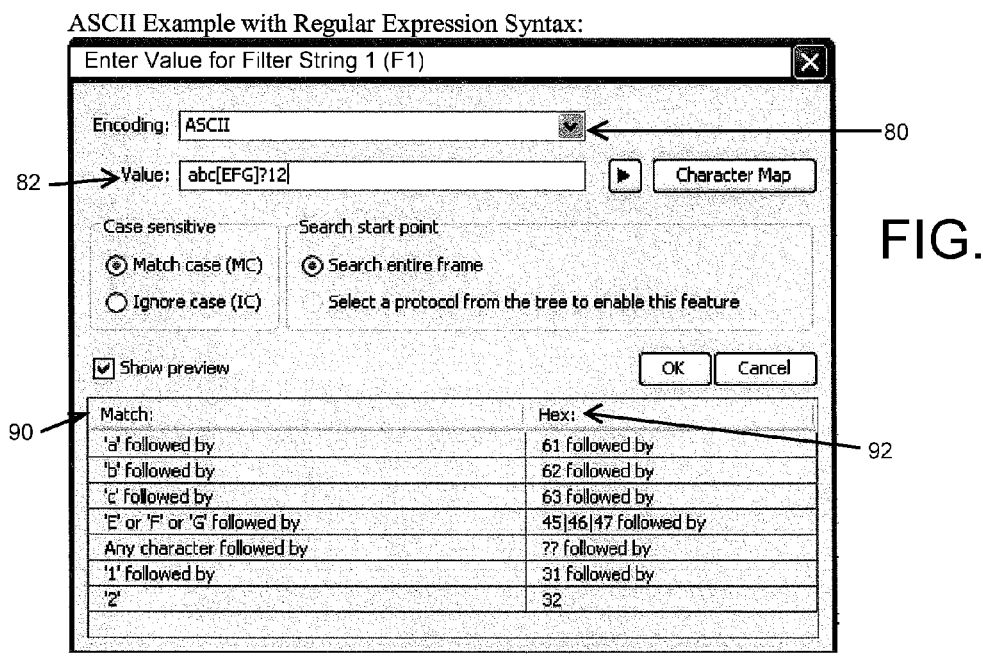

FIGS. 12 and 13, show additional examples, encoding of '0.1.3.6.5.1282134' in ASN.1 OID (BER encoding) and of an ASCII string with regular expression syntax therein 'abc[EFG]?12', which would produce a matching string criteria of a followed by b followed by c followed by (E or F or G) followed by any character followed by 1 followed by 2. A corresponding hexadecimal encoding is shown at 92 in FIG. 13.

From the above examples, it may be seen that a user is able to quickly enter data for string matching, and can see how such data will be encoded in the particular situation. This results in a much easier task for the user to look for data in network traffic, under a variety of encodings and protocols.

Free string match enables a user of the test instrument to find and capture anything in the network traffic, match any set of words or phrases when detected (regardless of the position in the packet—payload or header) in real-time to trigger the network test instrument to start or stop capturing and/or filter traffic. For example, a user might employ free string match to capture traffic around any application error message, detect traffic containing certain words or phrases in non-encrypted emails, web pages, file transfers or documents to identify illicit use of the network or detect downloading of restricted documents based on content or filenames (.doc, .xls, .pdf, etc.). Still further, a user can employ free string match to identify and track applications that are not allowed on the network such as streaming media that may consume valuable bandwidth, or P2P traffic that may pose a security risk. Multiple sets of triggers or filters can be defined to trigger a capture in an unattended operation, for later analysis, allowing analysis when the user has time, not when the event occurred.

Intermittent performance problems can also be diagnosed faster with free string match. Intermittent events, which can take days or even weeks to track down and solve, can be more quickly fixed. Use of the system can, for example, enable capture of traffic around any application error message, saving time and frustration when pinpointing elusive intermittent problems.

The system provides a graphical user interface for previewing encoded search strings as they are entered. A user who is trying to capture network traffic that contains a particular series of characters, digits or byte values, for example, is thus provided a mechanism for entering this data and understanding how the network test device will apply the data to the network traffic. A faster, more accurate and more easily understood mechanism for encoding the user's input and for previewing the search criteria is thereby accomplished.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A network test instrument, comprising:
   data entry user interface for entering a pattern match string to be encoded and for selection of an encoding type to be used for encoding the string for application of the pattern match string to network data monitored by the network test instrument;
   display user interface for displaying at least one representation of the pattern match string as will be encoded in a preview area of the display user interface;
   network traffic data storage;
   a network traffic filter employing the encoded pattern match string to filter monitored network data, said network traffic filter beginning capturing and storing network traffic that matches the encoded pattern match string into said network traffic data storage.

2. The network test instrument according to claim 1, wherein said display user interface comprises:
   a display of a textual representation of the pattern match string; and
   a display of a hexadecimal representation of the pattern match string.

3. The network test instrument according to claim 1, wherein said data entry user interface for selection of an encoding type comprises a set of plural selectable encoding types from which a user can select.

4. The network test instrument according to claim 3, wherein said set of plural selectable encoding types comprises: Hex, Decimal, ASCII, Integer, Unicode, and ASN.1 OID.

5. A method of operating a network test instrument, comprising:
   enabling a user to select an encoding format for a pattern match string;
   allowing the user to enter the pattern match string; and
   displaying the pattern match string to the user in a preview area as encoded in accordance with the encoding format, further comprising:
   employing the encoded pattern match string to filter network traffic, beginning capturing and storing network traffic that matches the encoded pattern match string.

6. The method according to claim 5, wherein said displaying is performed as the user is entering the pattern match string.

7. The method according to claim 5, wherein said displaying the pattern match string as encoded in accordance with the encoding format comprises:
   displaying a hexadecimal representation of the encoded pattern match string.

8. The method according to claim 5, wherein said displaying the pattern match string as encoded in accordance with the encoding format comprises:
   displaying a text representation of the encoded pattern match string.

9. The method according to claim 5, further comprising performing analysis processing of the captured network traffic.

10. The method according to claim 5, further comprising performing analysis processing of the captured network traffic.

11. The method according to claim 5, further comprising:
    enabling the user to specify a triggering event that defines when to begin applying the pattern match string to the network traffic.

12. The method according to claim 5, further comprising:
    enabling the user to specify whether to apply the pattern match string to an entire frame of a given frame of network traffic or whether to apply the pattern match string to a subset of the entire frame.

13. The method according to claim 5, wherein said enabling a user to select an encoding format for a pattern match string comprises enabling the user to select from a set of encoding types including, Hex, Decimal, ASCII, Integer, Unicode, and ASN.1 OID.

14. A method of operating a network test instrument, comprising:
 enabling a user to select an encoding format for a pattern match string to be applied to monitored network traffic;
 allowing the user to enter the pattern match string;
 providing a selectable option of either displaying or not displaying the pattern match string to the user in a preview area as encoded in accordance with the encoding format;
 displaying the pattern match string encoded with the encoding format if the option of displaying is selected;
 employing the encoded pattern match string to filter monitored network traffic, beginning capturing and storing monitored network traffic that matches the encoded pattern match string.

15. The method according to claim 14, wherein said enabling a user to select an encoding format for a pattern match string comprises enabling the user to select from a set of encoding types including, Hex, Decimal, ASCII, Integer, Unicode, and ASN.1 OID.

16. The method according to claim 14, further comprising performing analysis processing of the monitored network traffic.

17. The method according to claim 14, further comprising:
 enabling the user to specify a triggering event that defines when to begin applying the pattern match string to the monitored network traffic.

18. The method according to claim 14, further comprising:
 enabling the user to specify whether to apply the pattern match string to an entire frame of a given frame of monitored network traffic or whether to apply the pattern match string to a subset of the entire frame.

* * * * *